(12) United States Patent
Bjornson

(10) Patent No.: US 8,256,380 B2
(45) Date of Patent: Sep. 4, 2012

(54) DISPOSABLE FOLDING TYPE SANITARY TOILET FOR PETS

(76) Inventor: William Bjornson, Aloha, OR (US)

( * ) Notice: Subject to any disclaimer, the term of this patent is extended or adjusted under 35 U.S.C. 154(b) by 147 days.

(21) Appl. No.: 12/813,680

(22) Filed: Jun. 11, 2010

(65) Prior Publication Data

US 2010/0282175 A1    Nov. 11, 2010

(51) Int. Cl.
*A01K 29/00* (2006.01)
(52) U.S. Cl. ....................................................... 119/168
(58) Field of Classification Search .................. 119/168, 119/482, 498, 499; 248/460, 461, 165, 166; 220/6, 4.28, 4.21, 4.01, 666, 9.3, 9.2, 9.1; 4/479, 484; 190/105, 104, 103
See application file for complete search history.

(56) References Cited

U.S. PATENT DOCUMENTS

| | | | | |
|---|---|---|---|---|
| 2,791,367 A | * | 5/1957 | Mefford | 229/101 |
| 4,760,816 A | * | 8/1988 | Rhodes | 119/165 |
| 4,776,300 A | * | 10/1988 | Braddock | 119/168 |
| 4,800,842 A | * | 1/1989 | Jones, Jr. | 119/168 |
| 4,846,103 A | * | 7/1989 | Brown | 119/168 |
| 4,884,527 A | * | 12/1989 | Skirvin | 119/168 |
| 5,065,702 A | * | 11/1991 | Hasiuk | 119/168 |
| 5,203,282 A | * | 4/1993 | Hasiuk | 119/168 |
| 7,347,164 B2 | * | 3/2008 | Axelrod et al. | 119/499 |

* cited by examiner

*Primary Examiner* — Monica Williams
*Assistant Examiner* — Joshua Huson
(74) *Attorney, Agent, or Firm* — Chernoff, Vilhauer, McClung & Stenzel

(57) ABSTRACT

A disposable folding type sanitary toilet for pets includes a folding type receiving unit configured in the form of a box having a receiving space. A wall of the box is configured to fold such that the volume of the receiving unit is adjusted, thereby allowing the sanitary toilet to be easily stored and carried. The sanitary toilet further includes a case unit for containing the bottom of the receiving unit and protecting the bottom, top, and sides of the receiving unit. The receiving unit includes a top plate, a wall unit connected to the top plate, the wall unit having horizontal folds formed at its exterior for adjusting the vertical height of the wall unit, and a lower receiving part coupled to the bottom of the wall unit and having a receiving space. An attached filter may be deployed during closure to inhibit discharge of dust and/or microbial contaminants.

18 Claims, 18 Drawing Sheets

(a)

(b)

(a)　　　　　　(b)　　　　　　(c)

DISPOSABLE FOLDING TYPE SANITARY TOILET FOR PETS

BACKGROUND OF THE INVENTION

1. Field of the Invention

The present invention relates to a disposable folding type sanitary toilet for pets, and, more particularly, to a disposable folding type sanitary toilet for pets that is configured in a foldable type structure in which it is possible to easily adjust the volume of the disposable folding type sanitary toilet, to easily and conveniently store and carry the disposable folding type sanitary toilet and to sanitarily dispose of the disposable folding type sanitary toilet after use as a toilet by the pet.

2. Description of the Related Art

Generally, a toilet for pets is made of a heavy plastic material and is generally configured in the shape of a tray or a pan and contains a replaceable absorbent material (hereinafter referred to as litter) to receive and contain animal excrement. After some use, the container is cleaned and is used again with fresh litter. A cover may be connected to the tray. After a pet has used the toilet, therefore, it is necessary for a pet owner to replace used pet litter with new litter, which is troublesome. In addition, it is necessary for the pet owner to periodically clean the toilet, which is also troublesome.

Furthermore, the pet owner may be exposed to disease-causing germs (e.g. Toxoplasmosis), parasitic insects, allergenic dust, dirt, et cetera during replacement of pet litter and during cleaning of the toilet for pets. If he/she is a child or an elderly person, or anyone with compromised immunity such as a person with AIDS or a transplant patient, or, is a pregnant woman, the pet owner may be exposed to fatal disease or the fetus may be damaged.

Also, people with physical disabilities or elderly people who may be physically challenged or are otherwise weakened, but who also derive great psychological comfort from living with a pet, may find purchasing heavy litter replacement containers burdensome and difficult, and cleaning and/or changing the used litter in the box difficult as well.

Therefore, there is a necessity for a less burdensome and more hygienic method of dealing with pet excretory products than is currently available.

SUMMARY OF THE INVENTION

Therefore, the present invention has been made in view of the above problems, and it is an object of the present invention to provide a disposable folding type sanitary toilet for pets configured in a folding type structure such that the unit may be easily opened to a size adequate to allow pet entry, deployed, closed, sealed, and disposed of with minimal effort, and with easy replacement with a new disposable folding type sanitary toilet for pets.

It is another object of the present invention to provide a disposable folding type sanitary toilet for pets constructed such that horizontal folds are formed in a folding type receiving unit, thereby providing for easy adjustment of the height of the folding type receiving unit while maintaining an enclosed volume.

It is another object of the present invention to provide a disposable folding type sanitary toilet for pets including a lower receiving part, thereby easily receiving and holding pet litter.

It is another object of the present invention to provide a disposable folding type sanitary toilet for pets further including support units, thereby maintaining the height of the folding type receiving unit.

It is another object of the present invention to provide a disposable folding type sanitary toilet for pets wherein bending parts (hinges) are formed on the support unit in the form of transverse folding lines such that the top and bottom of the folding type receiving unit can be fixed in a folded state of the folding type receiving unit, thereby easily reducing the volume of the folding type receiving unit.

It is another object of the present invention to provide a disposable folding type sanitary toilet for pets constructed such that elastic tensioner assemblies are further formed on the support units thereby achieving the ability of the support units to fold when the folding type sanitary toilet for pets is closed and to maintain a tensioned vertical straightness and recovery from perturbation when the folding type sanitary toilet for pets is opened to its full volume. This elasticity further causes the support unit to maintain a vertical straight configuration until the folding type sanitary toilet for pets is purposefully closed.

It is another object of the present invention to provide a disposable folding type sanitary toilet for pets wherein a folding assist lever unit is further formed between a plurality of independent supporting bars such that the independent supporting bars may be simultaneously pressed when it is desirable to bend the support unit, thereby achieving easy bending of the support unit and closure of the folding type sanitary toilet for pets.

It is another object of the present invention to provide a disposable folding type sanitary toilet for pets constructed such that a cover unit may be opened toward the front of the folding type sanitary toilet for pets, thereby using the cover unit as a mat on which dirt or other matter adherent on the body of a pet may be deposited when the pet leaves the folding type receiving unit. This cover unit is preferably made of a flexible material with reinforcement so that it may also be folded under the disposable folding type sanitary toilet for pets when the toilet is deployed for use. An alternate embodiment would allow the cover unit to open toward the rear allowing the cover unit to be kept behind the folding type sanitary toilet for pets in, for example, a vertical position against a wall when lack of space or other conditions make a front mat undesirable.

It is another object of the present invention to provide a disposable folding type sanitary toilet for pets constructed such that an attached filter unit further includes a filter for closing the entrance of the folding type receiving unit to inhibit dirt or contaminants (e.g. disease-causing germs) present in the folding type receiving unit from being discharged out of the folding type receiving unit during closure, thereby allowing a more sanitary disposal of the disposable folding type sanitary toilet for pets.

It is yet another object of the present invention to provide a disposable folding type sanitary toilet for pets constructed such that locking tabs and locking slots are further formed in the case unit such that the case unit can be easily locked effecting a secure closed state when the disposable folding type sanitary toilet for pets is disposed of, thereby allowing easy and convenient disposal of the disposable folding type sanitary toilet for pets.

In accordance with the present invention, the above and other objects can be accomplished by the provision of a disposable folding type sanitary toilet for pets including a case unit and a folding type receiving unit provided in the case unit in a foldable manner, the folding type receiving unit being configured in the form of a box having a receiving space defined therein, the folding type receiving unit including a top plate, a wall unit connected to the top plate, the wall unit having horizontal folds formed at an exterior thereof in the shape of bellows of various possible geometries (rectangular, hexagonal, octagonal, et cetera) for allowing changes in the vertical height of the wall unit, a lower receiving part coupled to the bottom of the wall unit, the lower receiving part having a receiving space defined therein, and support units provided in the wall unit for maintaining the height of the wall unit, the support unit including a pair of supporting bars provided in the wall unit such that the supporting bars are spaced apart from each other by a predetermined distance for independent action in maintaining a predetermined height of the wall unit, bending parts (hinges) in the form of transverse folding lines formed at the middles of the respective supporting bars. Attached to or formed upon the supporting bar are three elements (herein together called the elastic tensioner assembly), one of which is disposed in such a manner as to overlap the folding line (hinge) to maintain straightness in (lock open) the supporting bar when unfolded. Further, another portion of the elastic tensioner elements secures elastic material (herein called the elastic member) in such a way as to provide foldable lever arms to enhance the elastic force available to maintain straightness of the supporting bar and to minimize the height profile of the folded supporting bar.

The disposable folding type sanitary toilet for pets may further include an upper end connection part provided at the upper ends of the supporting bars such that the upper end connection part is coupled to the lower side of the top plate and the top of the wall unit, and a lower end connection part provided at the lower ends of the supporting bars such that the lower end connection part is coupled to the top of the lower receiving part (tray) and the bottom of the wall unit. Also, the disposable folding type sanitary toilet for pets may further include a folding assist lever unit integrally connected to the upper end connection part of the support unit or attached independently to the wall unit. The folding assist lever unit may push the supporting bars such that the supporting bars fold simultaneously when pressure is applied to the folding assist lever unit in a state in which the supporting bars are straight.

The elastic tensioner assembly may be formed in various ways so as to effect a force able to maintain the verticality of the supporting bar and recovery of verticality upon perturbation of the supporting bar.

The disposable folding type sanitary toilet for pets may further include an entrance formed at one side of the wall unit for allowing a pet to enter and leave the folding type receiving unit therethrough and an attached deployable filter unit disposed inside the wall unit at the side or top of the wall unit adjacent to the entrance is formed for closing the entrance. The base of the filter unit may have a greater size than that of the entrance, and the filter unit may include a filter for inhibiting particles accumulated in the folding type receiving unit from being discharged out of the folding type receiving unit upon closure of the disposable folding type sanitary toilet.

The wall unit may be formed in the shape of a polygon when viewed in plan view, and the wall unit may further have polygonal protrusions formed between the horizontal folds provided at the exterior thereof. The protrusions may be configured such that a point on a first circumscribed line forming a corresponding one of the horizontal folds when viewed in development view is connected to two points on a first inscribed line adjacent to the first circumscribed line in oblique directions to form a first auxiliary circumscribed line and a first auxiliary inscribed line, a point on a second circumscribed line located on the same line as the point on the first circumscribed line is connected to the first auxiliary circumscribed line and the first auxiliary inscribed line to form a second auxiliary circumscribed line and a second auxiliary inscribed line, and the first auxiliary circumscribed line, the second auxiliary circumscribed line, the first auxiliary inscribed line, and the second auxiliary inscribed line are folded to form a protrusion configured in the shape of two triangles connected to each other at one side of each thereof.

The first circumscribed line, the first inscribed line, and the second circumscribed line may further form a protrusion in a horizontally symmetric manner while the first circumscribed line, the first inscribed line, and the second circumscribed line are spaced apart from the first auxiliary circumscribed line, the second auxiliary circumscribed line, the first auxiliary inscribed line, and the second auxiliary inscribed line by predetermined distances.

The wall unit may be configured such that a point on a first circumscribed line forming a corresponding one of the horizontal folds when viewed in development view is connected to a point on a first inscribed line adjacent to the first circumscribed line in an oblique direction to form a third auxiliary circumscribed line, and a point on a second circumscribed line located on the same line as the point on the first circumscribed line is connected to the first auxiliary circumscribed line to form a fourth auxiliary circumscribed line.

The case unit may include a fixing frame unit and a cover unit. The fixing frame unit may have a space defined therein for receiving the lower receiving part of the folding type receiving unit such that the lower receiving part is fixed in the space of the fixing frame unit, and the cover unit may be connected to one side of the fixing frame unit for serving as a packaging element during shipment and commercial display in a store, and when opened, as a mat on which dirt or other matter adherent on the body of a pet may be deposited as the pet exits the folding type receiving unit, and as a locking element during disposal. The cover unit may include a first side cover connected to one side of the fixing frame unit for covering one side of the folding type receiving unit in a folded state of the folding type receiving unit, a top cover integrally connected to the first side cover for covering the top of the folding type receiving unit, and a second side cover integrally connected to the top cover for covering the other side of the folding type receiving unit.

The fixing frame unit may be provided at one side thereof with a locking slot, and the cover unit may be provided at one side thereof covering the side of the fixing frame unit at which the locking slot is formed with a locking tab corresponding to the locking slot. The locking tab may have one side integrally connected to the cover unit and the other side cut and separated from the cover unit such that the other side of the locking tab may be engaged into the locking slot of the fixing frame unit upon pushing the locking tab.

The lower receiving part may have a predetermined height sufficient to receive pet litter.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings.

Figure 1:
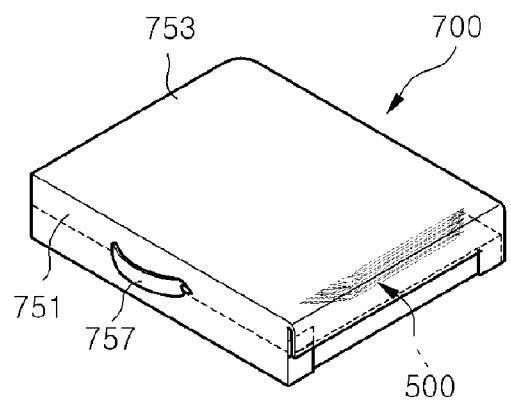
FIGS. 1(a) and 1(b) are perspective views respectively illustrating the external appearance of a disposable folding type sanitary toilet for pets according to the present invention.
Figure 1:
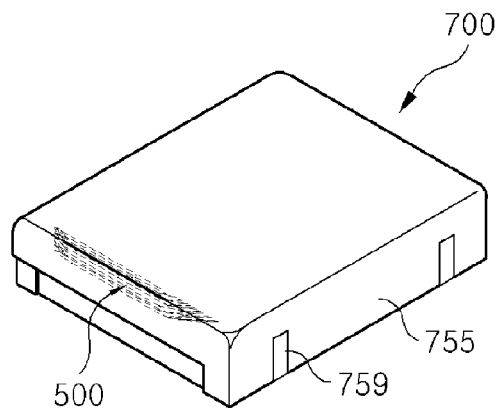
Figure 2:
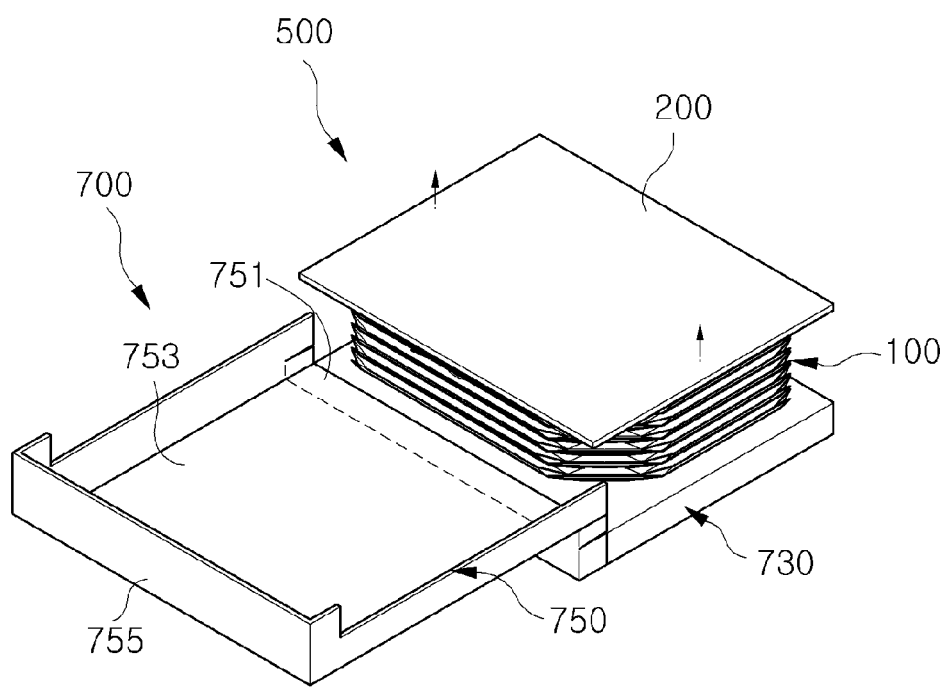
FIG. 2 is an open perspective view illustrating a cover unit of the disposable folding type sanitary toilet for pets according to the present invention.
Figure 3:
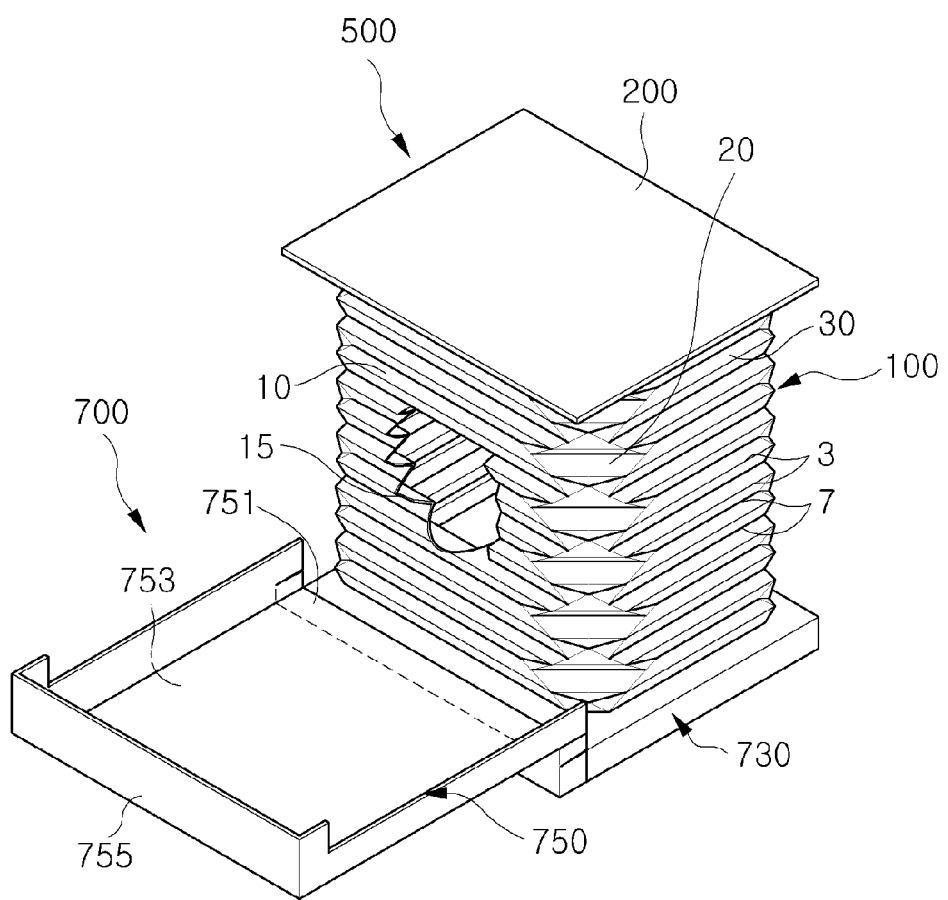
FIG. 3 is a perspective view illustrating a use of the disposable folding type sanitary toilet for pets according to the present invention.

FIGS. 1(a) and 1(b) are assembly perspective views respectively illustrating a disposable folding type sanitary toilet for pets according to the present invention in a completely folded state, and FIG. 2 is an open perspective view illustrating a case unit 700 of the disposable folding type sanitary toilet for pets according to the present invention.

The disposable folding type sanitary toilet for pets according to the present invention mainly includes a folding type receiving unit 500 and a case unit 700.

The folding type receiving unit 500 is configured in the form of a box having a receiving space defined therein. The folding type receiving unit 500 includes a folding type wall unit 100, which will allow the height and volume of the folding type receiving unit 500 to be adjusted.

The case unit 700 serves to accommodate the folding type receiving unit 500. Also, the case unit 700 serves to protect the folding type receiving unit 500 and to maintain the folded state of the folding type receiving unit 500.

As shown in FIG. 1(a), a handle 757 is formed at the exterior of the case unit 700 at one side thereof for allowing a user to easily carry, transport and dispose of the disposable folding type sanitary toilet for pets.

Also, as shown in FIG. 1(b), an adhesive member or a fastening member 759 is formed at the exterior of the case unit 700 at the other side thereof for maintaining the folded state of the folding type receiving unit 500 prior to deployment.

Figure 4:
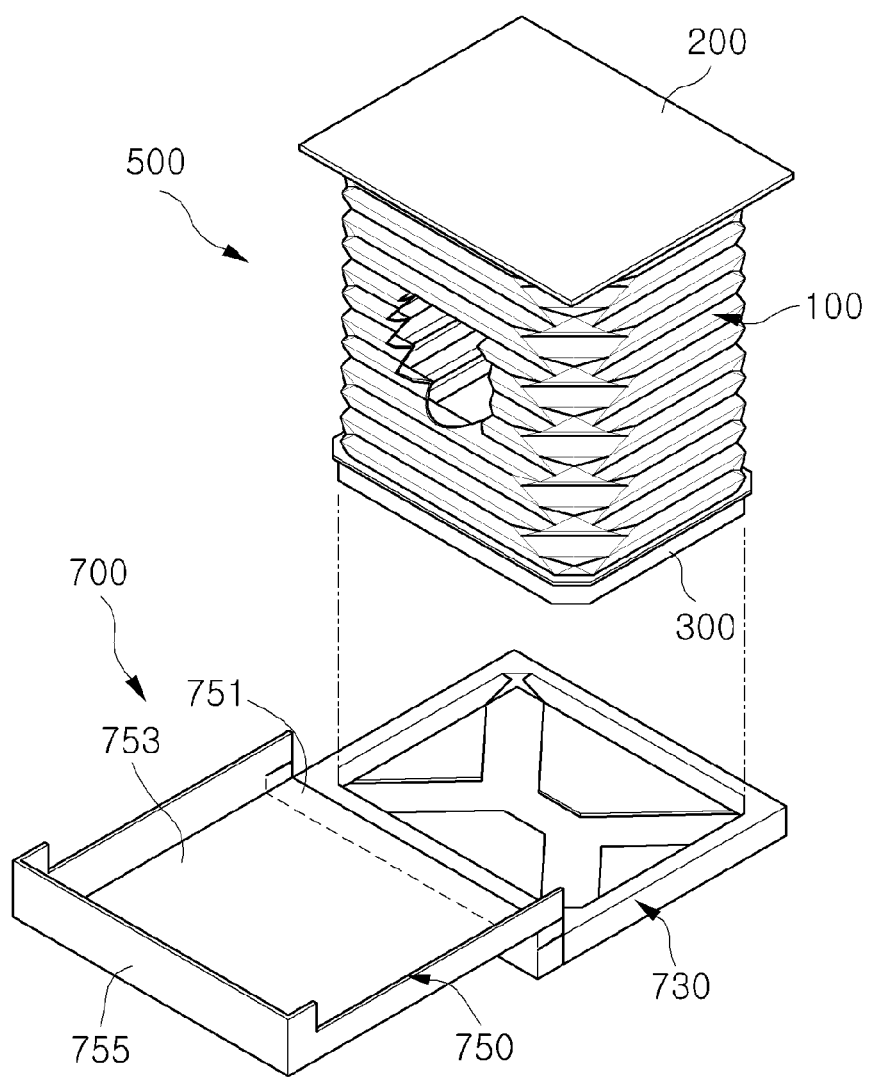
FIG. 4 is an exploded perspective view of the disposable folding type sanitary toilet for pets according to the present invention.
Figure 5:
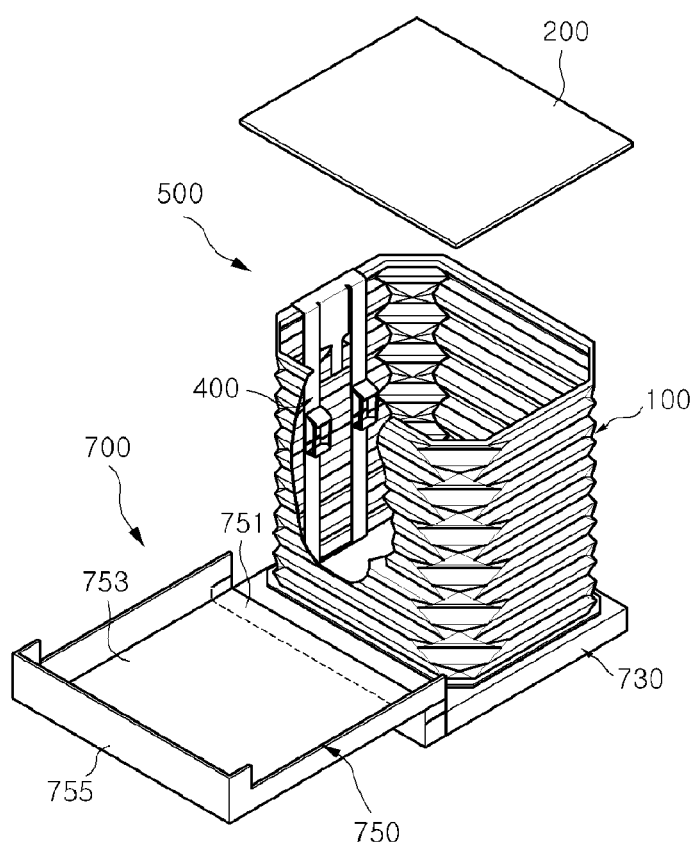
FIG. 5 is a side cutaway perspective view of the disposable folding type sanitary toilet for pets according to the present invention.
Figure 6:
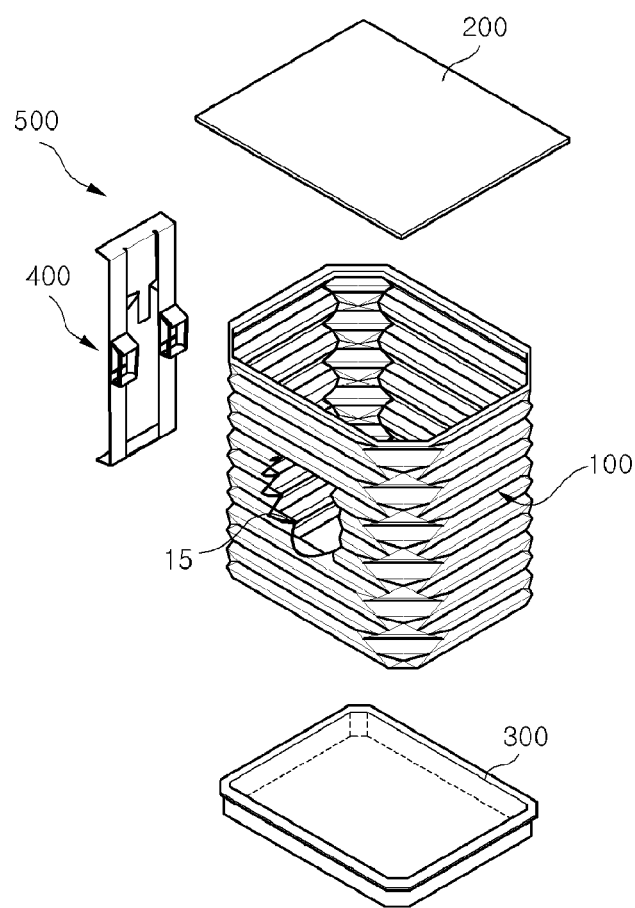
FIG. 6 is an exploded perspective view illustrating a folding type receiving unit of the disposable folding type sanitary toilet for pets according to the present invention.

FIG. 4 is an exploded perspective view illustrating the folding type receiving unit 500 and the case unit 700, FIG. 5 is a side cutaway perspective view illustrating the internal coupling state of the folding type receiving unit 500, and FIG. 6 is an exploded perspective view illustrating the folding type receiving unit 500 according to the present invention.

As shown in FIGS. 2-6, the folding type receiving unit 500 includes a wall unit 100 having horizontal folds formed at the exterior thereof in the shape of bellows for adjusting the vertical height of the wall unit 100, a top plate 200 formed at the top of the wall unit 100, a lower receiving part 300 coupled to the bottom of the wall unit 100, the lower receiving part 300 having a receiving space defined therein, and a support unit 400 for maintaining the height of the wall unit 100 after the height of the wall unit 100 of the folding type receiving unit 500 is increased by lifting the top plate 200 upward.

FIG. 6 illustrates an embodiment of the present invention. The wall unit 100 is formed in the shape of a rectangle, hexagon, octagon, et cetera when viewed in plan view. Polygonal protrusions (see, e.g., numeral 37 in FIG. 7) are formed respectively between the horizontal folds located at the exterior of the wall unit 100.

Figure 7:
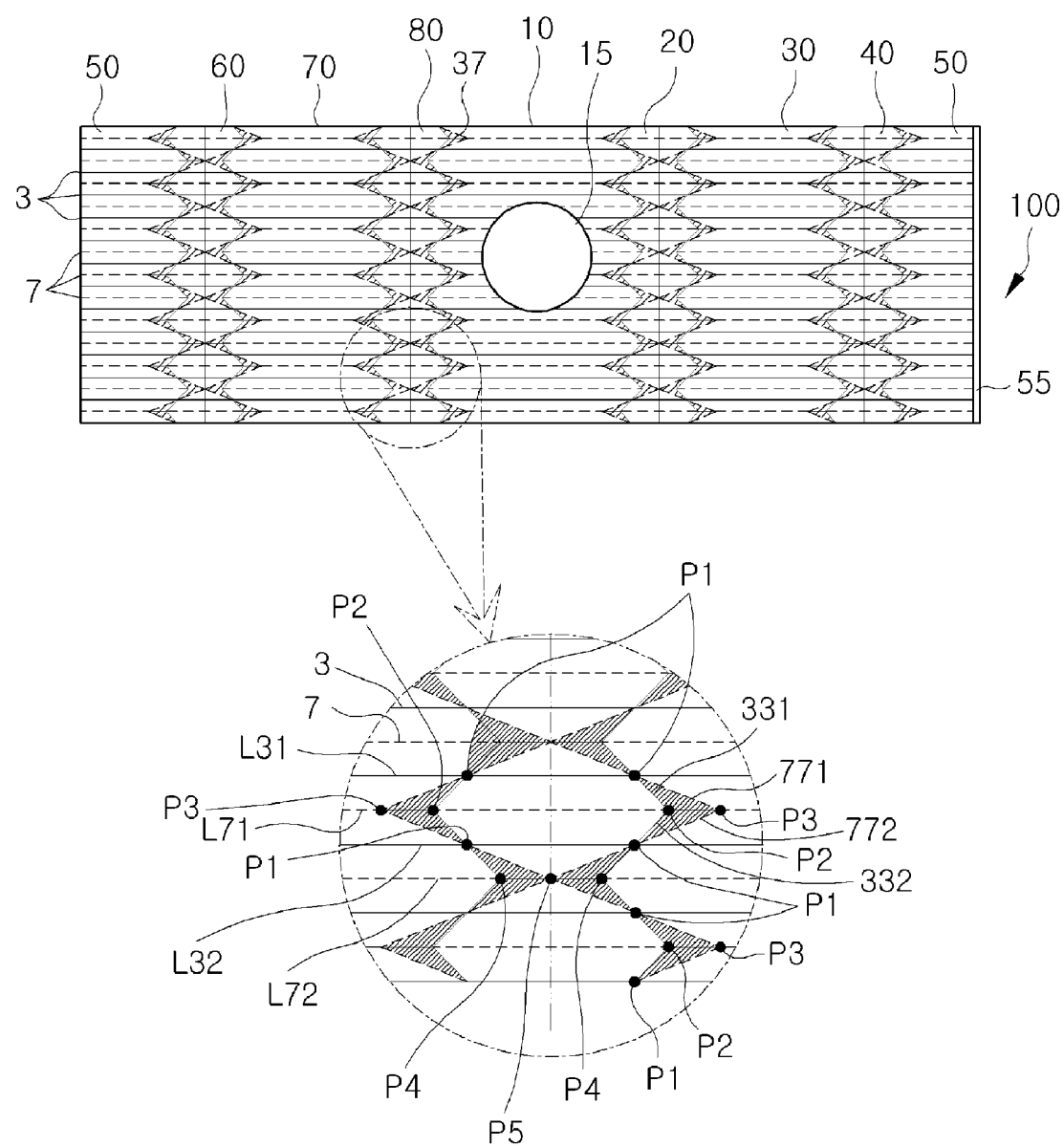
FIG. 7 is a development view illustrating a wall unit of the disposable folding type sanitary toilet for pets according to the present invention, the wall unit also being illustrated in a partially enlarged view.
Figure 8:
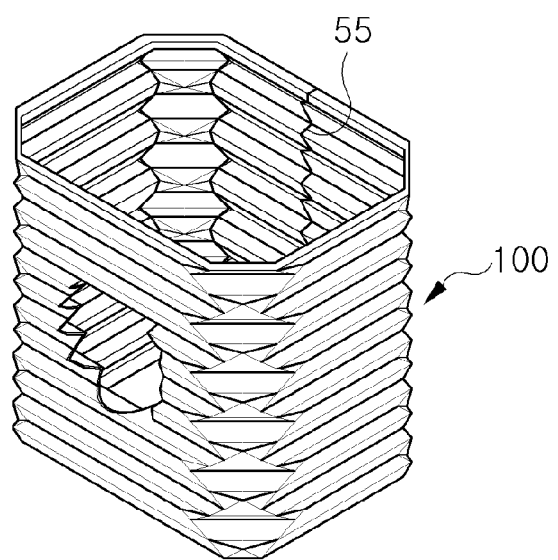
FIG. 8 is an assembly perspective view of the wall unit of the disposable folding type sanitary toilet for pets according to the present invention.

That is, as shown in FIG. 7, which illustrates a development view of the wall unit 100, horizontal circumscribed lines 3 and horizontal inscribed lines 7 are arranged at uniform intervals to form the horizontal folds at the exterior of the wall unit 100 in the shape of bellows such that the vertical height of the wall unit 100 can be adjusted by the horizontal folds.

Folding plates 20 and 80 having the protrusions 37 are formed respectively between a front plate 10 and a side plate 30 and between the front plate 10 and a side plate 70. Also, folding plates 40 and 60 having the protrusions 37 are formed respectively between a rear plate 50 and the side plate 30 and between the rear plate 50 and the side plate 70.

As shown in an enlarged view of the folding plates 20, 40, 60 and 80, first points P1 on a first circumscribed line L31 forming the corresponding horizontal fold when viewed in development view are connected respectively to second points P2 and third points P3 on a first inscribed line L71 adjacent to the first circumscribed line L31 in oblique directions to form first auxiliary circumscribed lines 331 and first auxiliary inscribed lines 771.

Also, first points P1 on a second circumscribed line L32 located on the same line as the first points P1 on the first circumscribed line L31 are connected respectively to the first auxiliary circumscribed lines 331 and the first auxiliary inscribed lines 771 on the first inscribed line L71, and also connected respectively to fourth points P4 and a fifth point P5 on a second inscribed line L72 in reverse oblique directions, to form second auxiliary circumscribed lines 332 and second auxiliary inscribed lines 772.

Consequently, as shown in FIG. 7, the first auxiliary circumscribed lines 331, the second auxiliary circumscribed lines 332, the first auxiliary inscribed lines 771, and the second auxiliary inscribed lines 772 are folded to form the protrusions 37 configured in the shape of two triangles connected to each other at one side of each thereof.

Also, the first circumscribed line L31, the first inscribed line L71, and the second circumscribed line L32 form the corresponding protrusion 37 in a horizontally symmetric manner while the first inscribed line L31, the first inscribed line L71, and the second circumscribed line L32 are spaced apart from the first auxiliary circumscribed lines 331, the second auxiliary circumscribed lines 332, the first auxiliary inscribed lines 771, and the second auxiliary inscribed lines 772 by predetermined distances.

The protrusions 37 are regularly formed at the exterior of the wall unit 100. The protrusions 37 may be formed in various shapes or at various angles.

At one side of the wall unit 100 is formed an entrance 15 through which a pet may enter and leave the folding type receiving unit 500.

Also, in this embodiment, the rear plate 50 of the wall unit 100 is vertically divided into two parts when viewed in development view. At one of the two divided parts of the rear plate 50 is formed a coupling member 55 for coupling the two divided parts of the rear plate 50. In another embodiment, the side plates of the wall unit 100 may be so divided with associated coupling parts.

The lower receiving part 300 is coupled to the bottom of the wall unit 100. The lower receiving part 300 has a receiving space in which a pet may deposit waste. It is preferable for the lower receiving part 300 to have a height sufficient to receive pet litter. The height of the lower receiving part 300 may, for example, be anywhere from 1 to 10 centimeters. In some embodiments, however, shallower lower receiving part trays (e.g., less than 1 centimeter) may be used, for example in embodiments designed for smaller animals; conversely, deeper (e.g., more than 10 centimeters) may be used, for example in embodiments designed for larger animals.

Also, it is preferable for the inner wall and the inner bottom of the lower receiving part 300 to be made of or coated with a waterproof material such that it is possible to prevent the leakage of waste, contaminants, water, moisture, et cetera, produced when a pet deposits waste in the lower receiving part 300. The inner wall and the inner bottom may also be made or coated with a non-stick material or compound, and/or an antistatic material or compound. In some embodiments, the inner wall or portions thereof may be made of a see-through, transparent, or translucent material to provide ambient light inside the wall unit 100; in other embodiments, the inner wall or portions thereof may be made of an opaque or substantially opaque material to provide darkness inside the wall unit 100. The inner wall and/or inner bottom may also be formed of materials or have coatings applied thereto to provide antiseptic, antimicrobial, disinfectant, odor neutralizing, odor freshening, scented, or other properties.

Figure 9:
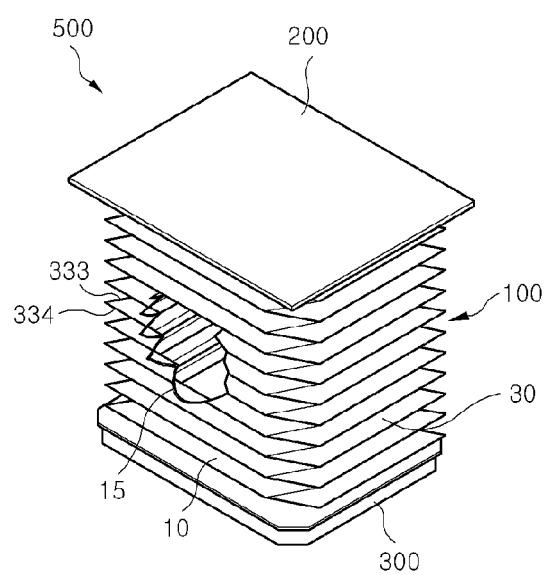
FIG. 9 is a perspective view illustrating another embodiment of the folding type receiving unit of the disposable folding type sanitary toilet for pets according to the present invention.

FIG. 9 is a perspective view illustrating another embodiment of the wall unit 100 according to the present invention. In this embodiment, the wall unit 100 is formed in the shape of a quadrangle when viewed in plan view. Also, third auxiliary circumscribed lines 333 and fourth auxiliary circumscribed lines 334 are formed at each corner in oblique directions.

Figure 10:
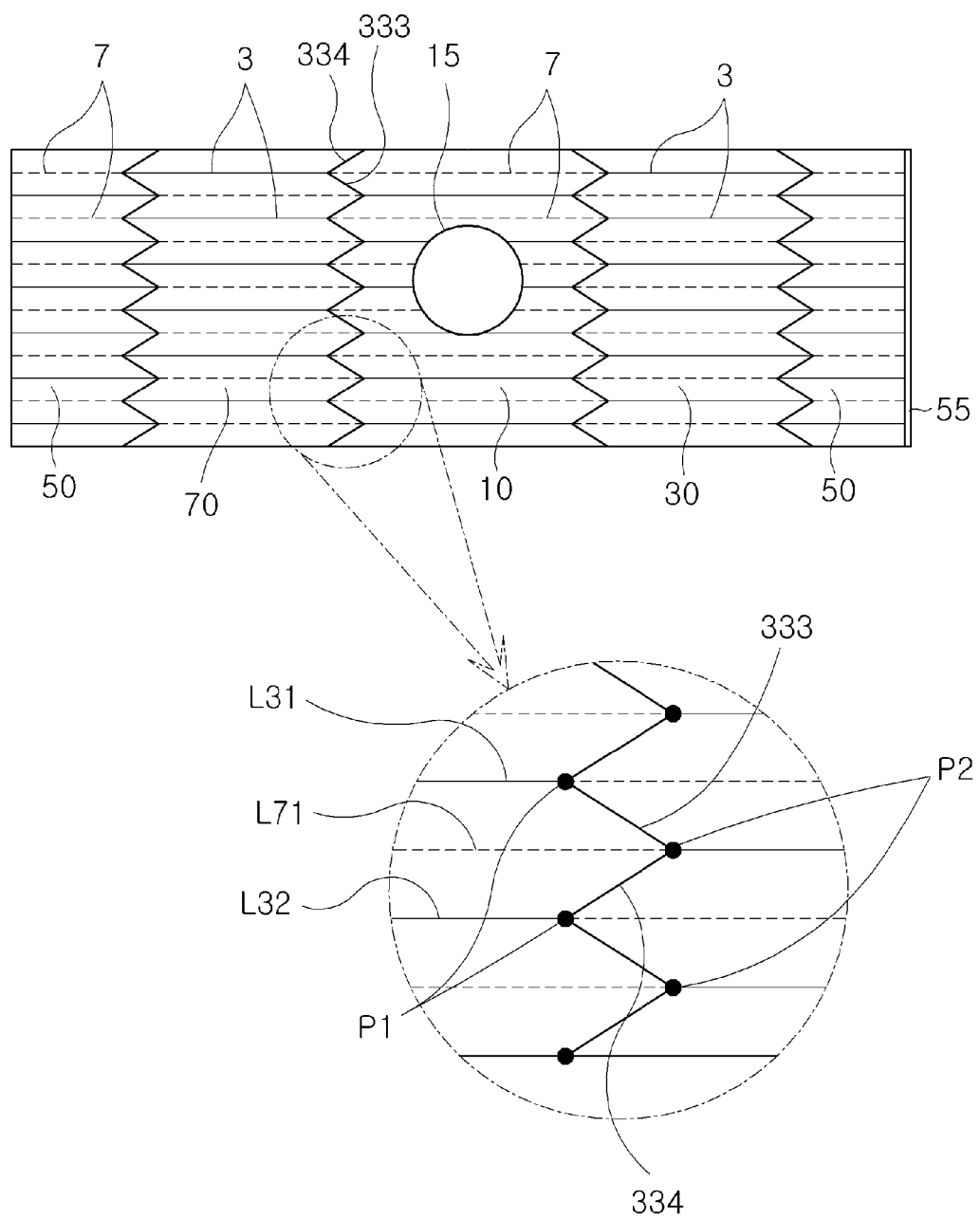
FIG. 10 is a development view illustrating another embodiment of the wall unit of the disposable folding type sanitary toilet for pets according to the present invention, the wall unit also being illustrated in a partially enlarged view.

More specifically, as shown in FIG. 10, which illustrates a development view of the wall unit 100, a first point P1 on a first circumscribed line L31 is connected to a second point P2 on a first inscribed line L71 in an oblique direction to form a third auxiliary circumscribed line 333.

Also, a first point P1 on a second circumscribed line L32 located on the same line as the first point P1 on the first circumscribed line L31 in the vertical direction is connected to the second point P2 to form a fourth auxiliary circumscribed line 334.

In this embodiment, the auxiliary circumscribed lines 333 and 334 are formed at an angle of 45 degrees to the vertical direction. However, the present invention is not limited thereto. For example, the auxiliary circumscribed lines 333 and 334 may be formed at various different angles according to various possible shapes of the wall unit 100.

The circumscribed lines 3 and the inscribed lines 7 are alternately connected to one another at neighboring plates of the wall unit 100 through the formation of the third auxiliary circumscribed lines 333 and the fourth auxiliary circumscribed lines 334.

That is, the circumscribed lines 3 of the front plate are connected to the inscribed lines 7 of the side plates 30 and 70, and the inscribed lines 7 of the front plate 10 are connected to the circumscribed lines 3 of the side plates 30 and 70.

Also, the circumscribed lines 3 of the rear plate 50 are connected to the inscribed lines 7 of the side plates 30 and 70, and the inscribed lines 7 of the rear plate 50 are connected to the circumscribed lines 3 of the side plates 30 and 70.

As show in FIG. 5, the support unit 400 has one end coupled to the top of the inner wall of the wall unit 100 and the other end coupled to the bottom of the inner wall of the wall unit 100. The support unit 400 serves to maintain the height of the wall unit 100 when the volume of the wall unit 100 is adjusted.

Figure 11:
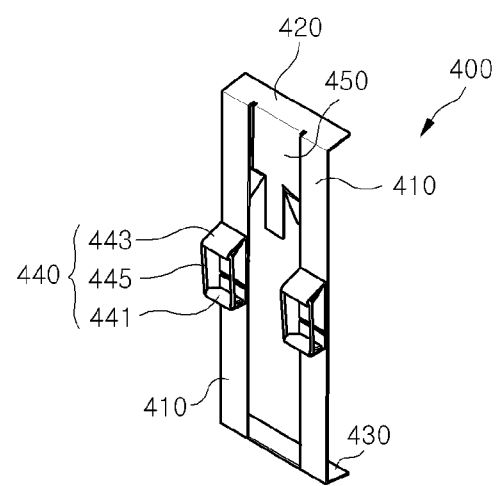
FIG. 11 is a perspective view illustrating a first embodiment of a support unit of the disposable folding type sanitary toilet for pets according to the present invention.

FIG. 11 is a view illustrating a first embodiment of the support unit 400 according to the present invention. In this embodiment, the support unit 400 includes first and second supporting bars 410, folding lines 415 (see, e.g., FIG. 12), an upper end connection part 420, a lower end connection part 430, elastic tensioner assemblies 440, and a folding assist lever unit 450.

The upper end connection part 420 is coupled to the top of the wall unit 100 and the bottom of the top plate 200. Each of the supporting bars 410 has one side integrally connected to the upper end connection part 420 and the other side integrally connected to the lower end connection part 430. The supporting bars 410 serve to maintain the height of the wall unit 100 when in use.

Also, the lower end connection part 430 is fixedly coupled to the bottom of the wall unit 100 and the top of the lower receiving part 300.

Figure 12:
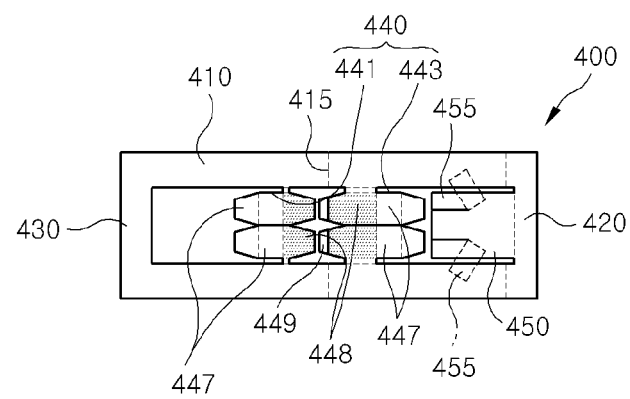
FIG. 12 is a development view illustrating the first embodiment of the support unit of the disposable folding type sanitary toilet for pets according to the present invention.

As shown in FIG. 12, each of the folding lines 415 is formed at the middle of each of the corresponding supporting bars 410 in the shape of a transverse folding line (hinge) such that the upper portion and the lower portion of each of the supporting bars 410 may approach each other when the supporting bars 410 are folded.

The elastic tensioner assembly 440 is formed of three elements: the elastic tensioner element A 441, elastic tensioner element B 443, and the elastic member(s) 445. Elastic tensioner element A 441 is composed of two portions: (1) the elastic tensioner element securement area 448 and (2) the elastic member securement area 447. Elastic tensioner element B 443 is composed of three areas: (1) the elastic tensioner element securement area 448, (2) the elastic member securement area 447, and (3) the reverse bend stop area 449. The reverse bend stop area 449 of elastic tensioner element B 443 is also referred to herein as a reverse bend stop.

The elastic tensioner element A 441 and the elastic tensioner element B 443 are affixed via the respective elastic tensioner element securement areas 448 at the upper side portion and the lower side portion of each of the supporting bars 410 adjacent to the folding line (hinge) 415. Between the elastic tensioner elements A 441 and B 443 are connected elastic members 445 which provide an elastic force when the supporting bar 410 is extended to maintain the straightness or verticality of the supporting bar 410. A portion of each elastic tensioner element A 441 and B 443, the elastic member securement areas 447, bend (pop up) upon straightening of the supporting bar to provide a lever arm to increase the elastic force of the elastic member(s) 445.

The elastic member(s) 445 connects the elastic member securement area 447 of the elastic tensioner element A 441 and the elastic member securement area 447 of the elastic tensioner element B 443 such that each of the supporting bars 410 may be maintained under elastic tension in a straight (unfolded) configuration while maintaining a minimal height profile in the folded configuration. In this embodiment, the elastic member 445 is implemented by an elastic strip such as a rubber band. However, the present invention is not limited thereto. For example, various forms of elastic members 445, such as wire/coil springs, flat springs, or other spring or elastic devices, may be used.

Also, the reverse bend stop area 449 of the elastic tensioner element B 443 will overlap the folding line 415 such that the two portions of the supporting bar 410 will be held in a straight configuration due to the force of the elastic member 445 and the overlap of the reverse bend stop area 449 across the folding line 415. The reverse bend stop area 449 may also be affixed as a separate element.

A plurality of supporting bars 410 are provided per each support unit 400 to provide redundant support in the event that one or another of the supporting bars 410 is perturbed, for example, by a pet pulling on it. The elastic member 445 will also provide a recovery force to return the supporting bar 410 to a straight configuration in such a situation.

Figure 13:
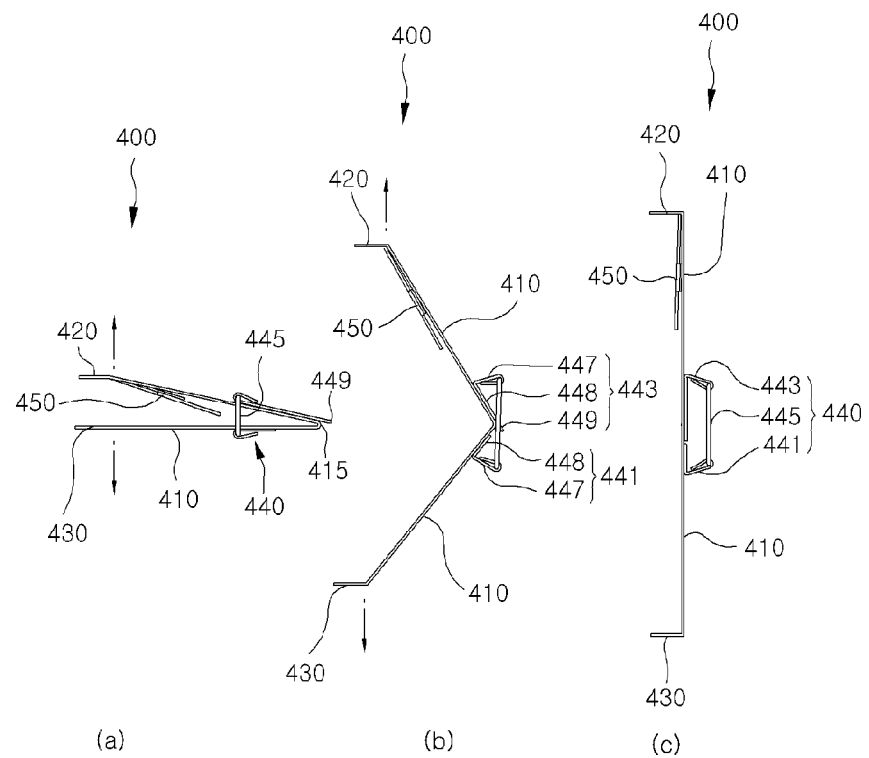
FIGS. 13(a) to 13(c) are side views respectively illustrating the operation of the first embodiment of the support unit of the disposable folding type sanitary toilet for pets according to the present invention.

FIGS. 13(a) to 13(c) are side views respectively illustrating the operation of the first embodiment of the support unit 400 according to the present invention. In FIG. 13(a), each of the supporting bars 410 is folded at the corresponding folding line 415. When upward force is applied to the upper end of each of the supporting bars 410 and downward force is applied to the lower end of each of the supporting bars 410, the distance between the upper end and the lower end of each of the supporting bars 410 is widened by a predetermined angle as shown in FIG. 13(b). As the elastic members 445 pass the folding line 415, the elastic member securement areas 447 of the elastic tensioners A 441 and B 443 'pop up' to a position normal to the supporting bar 410 and provide a lever arm structure to assist the elastic member 445 in maintaining verticality of the supporting bar 410.

Subsequently, as shown in FIG. 13(c), each of the supporting bars 410 is straightened such that the upper portion and the lower portion of each of the supporting bars 410 are arranged in a straight line within a short period of time due to the elastic force of each of the elastic members 445.

The folding assist lever unit 450 is located between the two supporting bars 410. One end of the folding assist lever unit 450 is integrally connected to the upper end connection part 420 or said folding assist lever unit 450 may be an independent part connected to the wall unit 100.

Also, side wings 455 contacting the supporting bars 410 are formed at the other side of the folding assist lever unit 450.

When pressure is applied to the folding assist lever unit 450 through the wall unit 100 during closure, the side wing portions 455 of the folding assist lever unit 450 contact the straight supporting bars 410 as shown in FIG. 13(c), the side wings 455 simultaneously push the upper portions of the respective supporting bars 410 transferring the applied pressure to the supporting bars 410 and causing the supporting bars 410 to fold as shown in the sequence FIGS. 13(c) to 13(b) to 13(a).

In other words, when a user pushes an arbitrary portion of the wall unit 100 at which the folding assist lever unit 450 is located without pushing exact portions of the supporting bars 410, the pushing force is applied to the entirety of the folding assist lever unit 450, and, at the same time, the supporting bars 410 adjacent to the folding assist lever unit 450 are pushed, with the result that the bending operation of the support unit 400 is easily performed.

Figure 14:
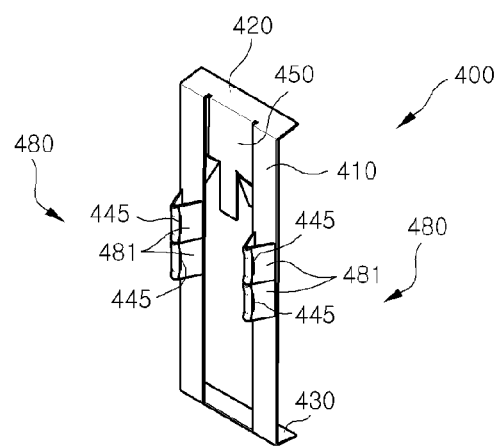
FIG. 14 is a perspective view illustrating a second embodiment of the support unit of the disposable folding type sanitary toilet for pets according to the present invention.

FIG. 14 is a view illustrating a second embodiment of the support unit 400 according to the present invention. The second embodiment is different from the first embodiment in that elastic tensioner assemblies 480 of the second embodiment are different from the elastic tensioner assemblies 440 of the first embodiment, and, therefore, elastic members 445 are connected in a different manner in the second embodiment.

Figure 15:
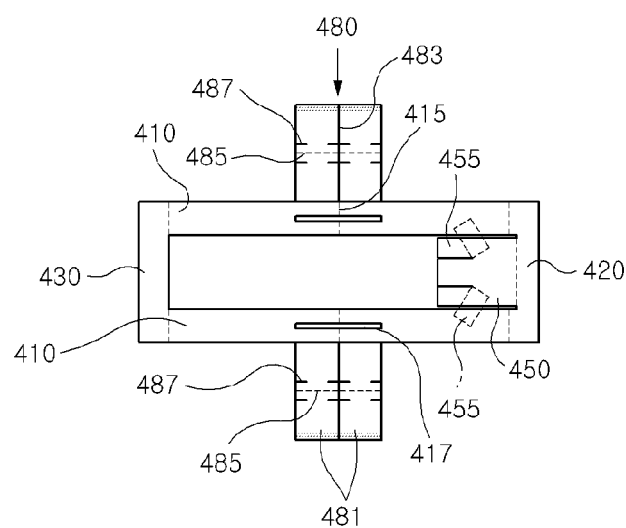
FIG. 15 is a development view illustrating the second embodiment of the support unit of the disposable folding type sanitary toilet for pets according to the present invention.

That is, in the second embodiment of the support unit 400, one side of each elastic tensioner assembly 480 is integrally connected to one side of a corresponding one of the supporting bars 410, two triangular elastic tensioner elements 481 of each elastic tensioner assembly 480 are bent about a bending line 485 (see, e.g., FIG. 15), and the other side of each elastic tensioner assembly 480 is coupled to the other side of a corresponding one of the supporting bars 410, as shown in FIG. 15, which illustrates a development view of the support unit 400.

Consequently, the triangular elastic tensioner elements 481 of each elastic tensioner assembly 480 protrude from the surface of the upper portion and the lower portion of each of the supporting bars 410 adjacent to the folding lines 415 of the supporting bars 410 in the shape of an inverted "V" separated by triangular elastic tensioner element separator slit lines 483. In this embodiment, the triangular elastic tensioner elements 481, when folded and glued, act as both lever arm and bend stop when the supporting bar is extended.

Also, the elastic member retainer slit lines 487 are formed at side portions of the triangular elastic tensioner element 481 of each elastic tensioner assembly 480 adjacent to the bending line 485 such that the elastic member retainer slit lines 487 are symmetric about the bending line 485.

That is, the elastic members 445 are fitted into the corresponding elastic member retainer slit lines 487 such that the one of the triangular elastic tensioner elements 481 and the other of the triangular elastic tensioner elements 481 are connected to each other by the corresponding elastic members 445. A short slot 417 is provided in the supporting bar 410 to accommodate the elastic member 445 when the supporting bar 410 is in the folded position.

Figure 16:
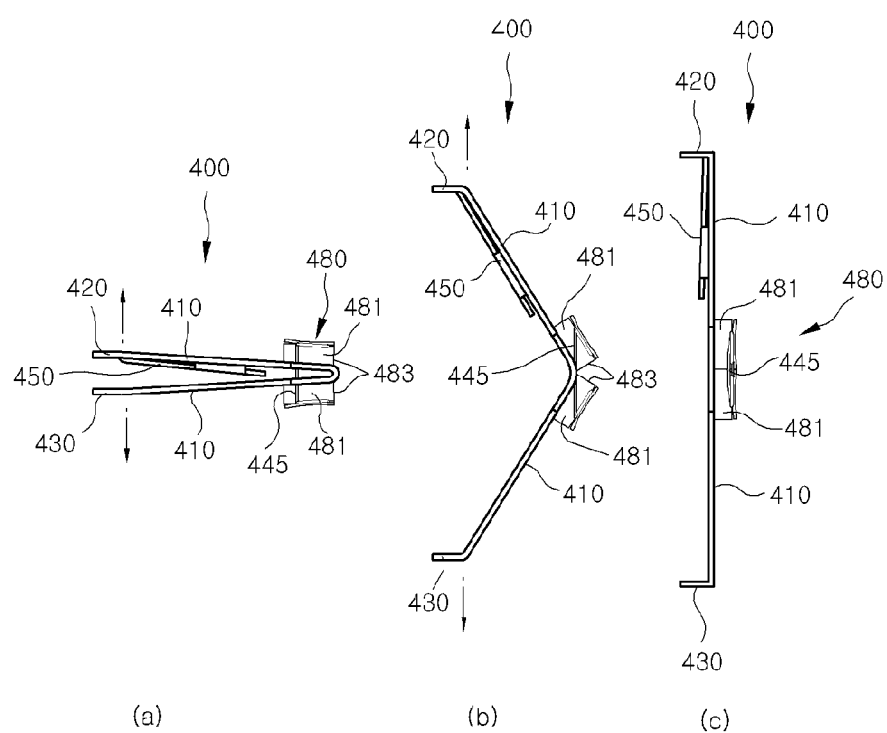
FIGS. 16(a) to 16(c) are side views respectively illustrating the operation of the second embodiment of the support unit of the disposable folding type sanitary toilet for pets according to the present invention.

FIGS. 16(a) to 16(c) are side views respectively illustrating the operation of the second embodiment of the support unit 400 according to the present invention. In FIG. 16(a), each of the supporting bars 410 is folded at corresponding folding lines 415 such that the upper portions and the lower portions of the supporting bars 410 approach each other in the same manner as in the first embodiment. When upward force is applied to the upper end of each of the supporting bars 410 and downward force is applied to the lower end of each of the supporting bars 410, the distance between the upper end and the lower end of each of the supporting bars 410 is widened by a predetermined angle as shown in FIG. 16(b).

Subsequently, as shown in FIG. 16(c), each of the supporting bars 410 is straightened such that the upper portion and the lower portion of each of the supporting bars 410 are arranged in a straight line within a short period of time due to elastic force of the elastic member 445.

That is, the support unit 400 according to the present invention maintains the volume of the folding type receiving unit 500 using an elastic mechanism, thereby improving convenience of use.

The shape of the support unit 400 is not limited by this embodiment of the present invention. For example, the support unit may be formed in various different shapes.

As shown in FIG. 4, the case unit 700 includes a fixing frame unit 730 and a cover unit 750. The fixing frame unit 730 has a space defined therein for receiving the lower receiving part 300. The fixing frame unit 730 serves to fix the bottom of the folding type receiving unit 500 after the attachment of the folding type receiving unit 500 to the fixing frame unit 730.

The cover unit 750 is connected to one side of the fixing frame unit 730. The cover unit 750 serves to protect the folding type receiving unit 500 and to maintain the folded state of the folding type receiving unit 500 while the case unit 700 contains the folding type receiving unit 500 therein.

Also, after opening of the cover unit 750, the cover unit 750 may serve as a mat on which dirt or other matter adherent on the body of a pet may be deposited when a pet leaves the folding type receiving unit 500. An alternate embodiment would allow the cover unit 750 to open toward the rear allowing the cover unit 750 to be kept behind the disposable folding type sanitary toilet for pets, for example for storing the cover unit 750 in a vertical position against a wall when lack of space or other conditions make a front mat undesirable.

The cover unit 750 includes a first side cover 751, a top cover 753, and a second side cover 755.

The first side cover 751 is connected to one side of the fixing frame unit 730. The first side cover 751 serves to cover one side of the folding type receiving unit 500 in a folded state of the folding type receiving unit 500. In this embodiment, the handle 757 is formed at the exterior of the first side cover 751 for allowing a user to easily carry the disposable folding type sanitary toilet for pets.

During opening of the cover unit 750, the handle 757 is located below the cover unit 750, and therefore, is not exposed to waste and contaminants contained in the folding type receiving unit 500. Consequently, it is possible to sanitarily handle and dispose of the disposable folding type sanitary toilet for pets through the use of the handle 757.

The top cover 753 is integrally connected to the first side cover 751 for covering the top of the folding type receiving unit 500. The top cover 753 may also be connected to the first side cover 751 using a hinge. The second side cover 755 is integrally connected to the top cover 753 for covering the other side of the folding type receiving unit 500.

Also, the adhesive member or the fastening member 759 is formed at the exterior of the second side cover 755 for maintaining the folded state of the wall unit 100 while the case unit 700 contains the folding type receiving unit 500 therein. In this embodiment, the adhesive member or the fastening member 759 connects the exterior of the second side cover 755 and the bottom of the fixing frame unit 730.

Figure 17:
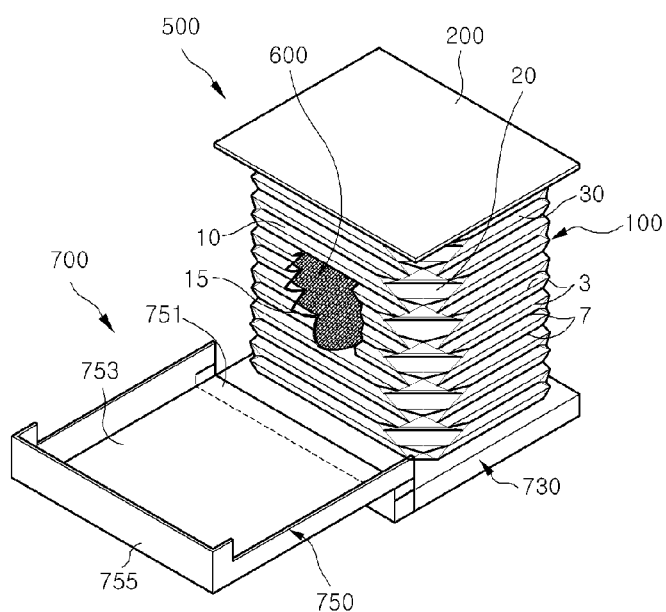
FIG. 17 is a perspective view of the disposable folding type sanitary toilet for pets according to the present invention illustrating a filter unit further included in the disposable folding type sanitary toilet for pets.
Figure 18:
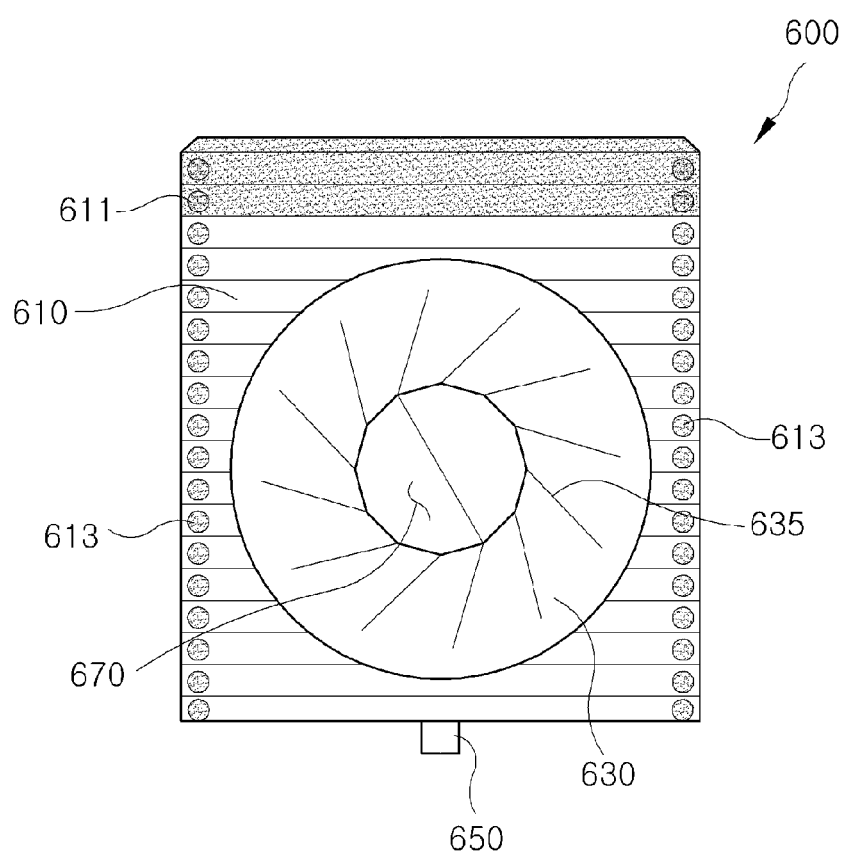
FIG. 18 is a front view of the filter unit of the disposable folding type sanitary toilet for pets according to the present invention.

FIG. 17 is a perspective view of the disposable folding type sanitary toilet for pets according to the present invention further including a filter unit 600 disposed inside one side wall of the wall unit 100 having the entrance 15 formed therein for closing the entrance 15. The filter unit 600 has a greater size than that of the entrance 15. The filter unit 600 mainly includes a filter 630 and a filter support part 610 (see, e.g., FIG. 18).

The filter 630 serves to inhibit dirt accumulated in the folding type receiving unit 500 from being discharged out of the folding type receiving unit 500 when the volume of the folding type receiving unit 500 is reduced during closure after the use of the disposable folding type sanitary toilet for pets.

It is preferable for the filter 630 to be formed of a nonwoven fabric, a porous fiber, or an impregnated woven or mesh material. The filter 630 may also be formed of or have coatings applied thereto to provide antiseptic, antimicrobial, disinfectant, odor neutralizing, odor freshening, scented, or other properties. Also, it is preferable but not necessary for the filter 630 to be curved into a rough hemispherical shape when the filter 630 is spread.

More specifically, a large amount of dirt, germs (e.g. disease-causing germs such as toxoplasmosis) or other microorganisms may be present in the folding type receiving unit 500 after use by a pet. Also, the wall unit 100 is folded down during disposal of the disposable folding type sanitary for pets which will cause it to discharge air. At this time, dirt, dust, and/or microorganisms may be discharged out of the folding type receiving unit 500 through the entrance 15 due to pressure of air exiting the folding type receiving unit 500.

The filter unit 600 inhibits contaminants present in the folding type receiving unit 500 from being discharged out of the folding type receiving unit 500 when the folding type receiving unit 500 is closed. Since, in the case of a protruding filter, the filter 630 protrudes in a hemispherical way when the filter 630 is spread and is slightly larger than the entrance 15, the filter 630 protrudes through the entrance 15 in tight contact with the perimeter of the entrance 15 when the internal pressure of the folding type receiving unit 500 is increased during closure of the receiving unit 500.

During closure of the folding type receiving unit 500, therefore, it is possible to prevent a gap from being generated at the outer circumference of the filter 630 where it meets the edge of the entrance 15.

In this embodiment, the filter 630 has filter folding lines 635, by which the volume of the filter 630 is easily reduced when not in use.

The filter support part 610 is integrally connected to the outer circumference of the filter 630. The filter support part 610 is coupled to the inside of the wall unit 100 at one side thereof adjacent to the entrance 15. The filter support part 610 may have horizontal folds identical to those formed at one side of the wall unit 100 in the shape of bellows.

Preferably, a filter support attachment area 611 is provided at the upper end of the filter support part 610. Other attachment options may also be used. The filter support attachment area 611 is attached to the inside of the wall unit 100. Also preferably, auxiliary tacky adhesive areas 613 are provided at opposite sides of the filter support part 610.

When the filter support part 610 is undeployed, the auxiliary tacky adhesive areas 613 are located between the respective horizontal folds for maintaining the compressed state of the filter support part 610. When the lower end of the filter support part 610 is pulled downward and the filter 630 is pulled outward using the spread grip 670, the auxiliary tacky adhesive areas 613 become attached to the inner wall of the wall unit 100 at both sides of the entrance 15.

In this embodiment, it is preferable that a downward pulling grip 650 is provided at the lower end of the filter unit 600 for allowing a user to easily draw the filter unit 600 downward.

Figure 19:
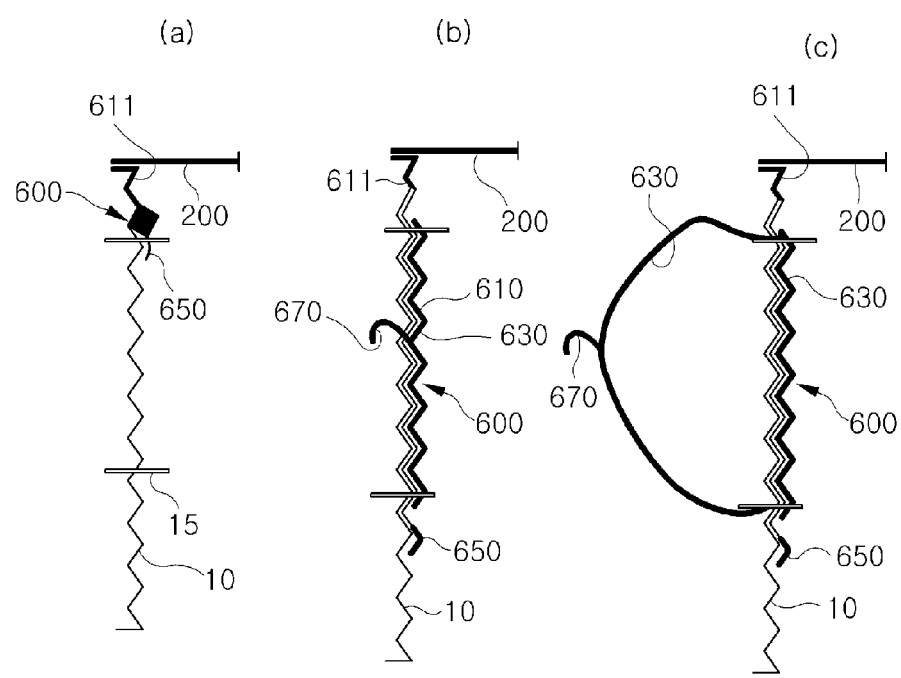
FIGS. 19(a) to 19(c) are side views respectively illustrating the operation of the filter unit of the disposable folding type sanitary toilet for pets according to the present invention.

FIGS. 19(*a*) to 19(*c*) are side views respectively illustrating the operation of the filter unit 600 according to the present invention. As shown in FIG. 19(*a*), the filter unit 600 is attached to the inner upper side of the front plate of the wall unit 100 by the filter support attachment area 611. At this time, the filter 630 and the filter support part 610 are tightly folded.

As shown in FIG. 19(*b*), the downward pulling grip 650 is pulled downward, such that the filter 630 and the filter support part 610 are drawn downward.

In this embodiment, it is preferable that the filter 630 is provided at the center of the exterior thereof with a spread grip 670 for allowing a user to easily spread the filter 630.

That is, the filter 630 according to the present invention is formed in the shape of a rough hemisphere. As shown in FIG. 19(*c*), the center of the filter 630 is pulled outward from the entrance 15 using the spread grip 670 such that the hemispheric filter 630 easily protrudes out of the entrance 15.

Also, the portion of the filter 630 protruding out of the entrance 15 is swelled in the shape of a hemisphere by the pressure of the air discharged from the folding type receiving unit 500 upon closing the folding type receiving unit 500. At this time, the filter 630 is in tight contact with the outer circumference of the entrance 15, with the result that air only passes through the entrance 15 through the filter 630, and any detritus present in the folding type receiving unit 500 is inhibited from being discharged from the folding type receiving unit 500 through the entrance 15.

Figure 20:
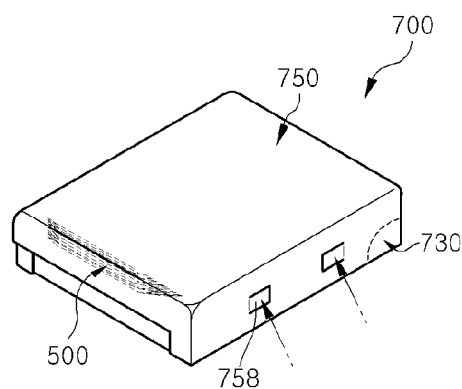
FIG. 20 is a perspective view illustrating the cover unit of the disposable folding type sanitary toilet for pets according to the present invention.
Figure 21:
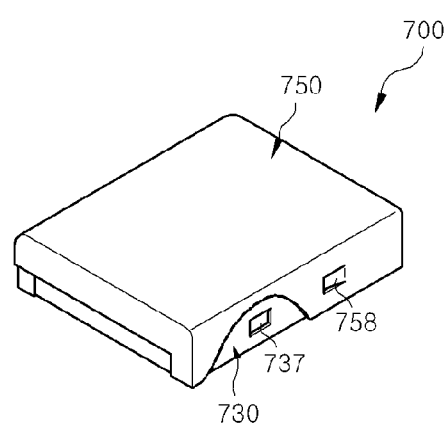
FIG. 21 is a cutaway perspective view of the cover unit of the disposable folding type sanitary toilet for pets according to the present invention.

Referring to FIGS. 20 and 21, the case unit 700 of the disposable folding type sanitary toilet for pets according to the present invention is further provided with at least one locking tab 758 and at least one locking slot 737 with a plurality preferable.

The locking tab 758 is formed at one side of the cover unit 750, e.g., the second side cover 755 from which the cover unit 750 is opened. In this embodiment, two locking tabs 758 cut in rectangular shape ([) are provided at the second side cover 755 in a symmetric manner such that one of each of the locking tabs 758 is connected to the second side cover 755.

Also, in this embodiment, two locking slots 737 are formed at one side of the fixing frame unit 730, which contacts the second side cover 755 when the folding type receiving unit 500 and the fixing frame unit 730 are covered by the cover unit 750, such that the locking slots 737 correspond to and align with the respective locking tabs 758 when the case unit 700 is closed.

Each of the locking slots 737 has a size sufficient to receive and hold a corresponding one of the locking tabs 758 when the locking tabs 758 are pushed into the locking slots 737.

The disposable folding type sanitary toilet for pets according to the present invention is disposed of as follows. First, the cover unit 750 is closed to cover the top of the folding type receiving unit 500 and the sides of the fixing frame unit 730. When the locking tabs 758 are pushed, the locking tabs 758 are engaged into the corresponding locking slots 737.

The cover unit 750 is prevented from being opened by the engagement between the locking tabs 758 and the locking slots 737, thereby achieving complete locking of the case unit 700.

Therefore, the present invention has the effect of achieving complete locking of the case unit 700 of the disposable folding type sanitary toilet for pets by the engagement between the locking tabs 758 and the locking slots 737, thereby preventing dirt and contaminants from being discharged out of the folding type receiving unit 500 and achieving safe and sanitary disposal of the disposable folding type sanitary toilet for pets.

In the disposable folding type sanitary toilet for pets according to the present invention, it is possible to adjust the height and volume of the wall unit. Consequently, the present invention has the effect of enabling the disposable folding type sanitary toilet for pets to be easily carried and stored and enabling the disposable folding type sanitary toilet for pets to be easily replaced with a new one after use. The wall unit and/or disposable folding type sanitary toilet may be manufactured in various sizes: smaller units may be more portable, and better suited for smaller pets such as cats; larger units may provide for a larger volume of litter and may thereby require less frequent replacing, and may be better suited for larger pets such as large dogs. Smaller units may have shorter support units 400 and occupy a smaller floor area; larger units may have a longer support units and have larger footprint (i.e., a larger to plate 200, lower reveiving part 300, ... ). The wall unit and/or disposable folding type sanitary toilet may also be deployed to different heights or sizes depending on the space available and/or the size of a pet. For example, when deployed for a small pet, the wall unit may be deployed to a low height sufficient for the pet to fit inside the wall unit; when deployed for a large pet, the wall unit may be deployed to its full height such that the support unit 400 is fully extended.

In addition, it is possible for a user to easily and conveniently dispose of the disposable folding type sanitary toilet for pets with increased protection of the user from exposure to waste, germs and dirt produced from the contents of the folding type receiving unit. Consequently, the present invention has the effect of enabling the disposable folding type sanitary toilet for pets to be handled with greatly increased sanitation.

As is apparent from the above description, the disposable folding type sanitary toilet for pets according to the present invention is configured in a folding type structure such that the toilet may be closed and locked. Consequently, the present invention has the effect of allowing the user to easily dispose of the disposable folding type sanitary toilet for pets.

Also, horizontal folds formed in the folding type receiving unit allow easy opening and closure of the receiving unit.

Also, the disposable folding type sanitary toilet for pets includes the lower receiving part, and therefore, the present invention has the effect of easily receiving pet litter.

Also, the disposable folding type sanitary toilet for pets further includes the support unit, and therefore, the present invention has the effect of maintaining the height of the folding type receiving unit in an open configuration even during possible interaction of the pet with the supporting bar.

Also, the bending parts are formed on the support unit such that the top plate and the lower receiving part of the folding type receiving unit can be fixed in the folded state of the folding type receiving unit, and therefore, the present invention has the effect of easily reducing the volume of the folding type receiving unit.

Also, the elastic tensioner assemblies are further formed on the support unit in a way that provides a lever arm structure enhancing the elastic force of the elastic member, and therefore, the present invention has the effect of achieving easy manipulation of the bending parts and locking their position using elasticity and an overlapping bend stop, and, also redundant independently acting supporting bars allowing for recovery of straightness after perturbation of a single supporting bar.

Also, the folding assist lever unit is further formed between the supporting bars such that the independent supporting bars can be simultaneously pressed when the support unit is to be bent, and therefore, the present invention has the effect of achieving easy bending of the support unit for closure.

Also, the disposable folding type sanitary toilet for pets includes the case unit in which a portion of the folding type receiving unit is fixedly disposed, and therefore, the present invention has the effect of protecting the exterior of the folding type receiving unit in the folded state of the folding type receiving unit.

Also, the cover unit is provided such that the cover unit can be opened, and therefore, the present invention has the effect of using the cover unit as a mat on which dirt or other matter adherent on the body of a pet may be deposited when the pet leaves the folding type receiving unit.

Also, the filter unit further includes the filter for closing the entrance of the folding type receiving unit to inhibit dirt and/or contaminants (e.g. disease-causing germs) present in the folding type receiving unit from being discharged out of the folding type receiving unit during closure, and therefore, the present invention has the effect of increasing sanitation during disposal of the disposable folding type sanitary toilet for pets.

Also, the locking tabs and the locking slots are further formed at the case unit such that the case unit can be easily locked when the disposable folding type sanitary toilet for pets is disposed of, and therefore, the present invention has the effect of enabling the disposable folding type sanitary toilet for pets to be easily and conveniently disposed of.

Also, the folding type receiving unit can be pressed into the shape of a box and a bag having a small volume, and therefore, the present invention has the effect of easily storing and carrying the disposable folding type sanitary toilets for pets in a stacked state.

Also, the folding type receiving unit is configured in a closed structure excluding the entrance of the folding type receiving unit such that pet litter or dirt present in the folding type receiving unit is inhibited from being discharged out of the disposable folding type sanitary toilet for pets, and therefore, the present invention has the effect of protecting a dwelling or other deployment area from being soiled and/or contaminated with pet waste products or agents therein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disposable folding type sanitary toilet for pets comprising:
   a case unit; and
   a folding type receiving unit provided in the case unit in a foldable manner, the folding type receiving unit being configured in the form of a box having a receiving space defined therein, the folding type receiving unit comprising:
      a top plate;
      a wall unit connected to the top plate, the wall unit having horizontal folds formed at an exterior thereof in the shape of bellows for allowing adjustment of the vertical height of the wall unit;
      a lower receiving part coupled to the bottom of the wall unit, the lower receiving part having a receiving space defined therein; and
      a support unit provided in the wall unit for maintaining the height of the wall unit when opened, the support unit comprising:
         first and second independently operated supporting bars provided in the wall unit such that the first and second supporting bars are spaced apart from each other by a predetermined distance for maintaining a predetermined height of the wall unit;
         first and second bending parts respectively formed as transverse folding lines at the middles of the first and second supporting bars, and
         first and second reverse bend stops respectively formed on the first and second supporting bars such that each reverse bend stop overlaps the folding line of the respective supporting bar to assist in keeping the supporting bars straight when unfolded;
         first and second tensioner elements mounted on each of the first and second supporting bars, the first and second tensioner elements being mounted on opposite sides of the bending part of the respective supporting bar; and
         first and second elastic members each connected between the first and second tensioner elements of a respective one of the first and second supporting bars and configured to produce an elastic force to maintain the supporting bar fully straightened when the supporting bar is unfolded.

2. The disposable folding type sanitary toilet for pets according to claim 1, further comprising:
   an upper end connection part provided at upper ends of the first and second supporting bars such that the upper end connection part is coupled to a lower side of the top plate and a top end of the wall unit; and
   a lower end connection part provided at lower ends of the first and second supporting bars such that the lower end connection part is coupled to a top of the lower receiving part and a bottom end of the wall unit.

3. The disposable folding type sanitary toilet for pets according to claim 2, further comprising:
   a folding assist lever unit connected to the upper end connection part, wherein the folding assist lever unit is configured to apply a force to the first and second supporting bars such that the supporting bars fold simultaneously when pressure is applied to the folding assist lever unit and the supporting bars are straight.

4. The disposable folding type sanitary toilet for pets according to claim 1, wherein each of the first and second supporting bars has a slot formed therein, and wherein the first and second elastic members enter the slot of the respective first and second supporting bar when the supporting bar is folded.

5. The disposable folding type sanitary toilet for pets according to claim 1, further comprising:
   an entrance formed at one side of the wall unit for allowing a pet to enter and leave the folding type receiving unit therethrough; and
   a filter unit for closing the entrance disposed inside the wall unit on the side of the wall unit having the entrance.

6. The disposable folding type sanitary toilet for pets according to claim 5,
   wherein the filter unit has a greater size than the entrance, and the filter unit comprises:
      a filter support part, and a filter for inhibiting dust and potential pathogens accumulated in the folding type receiving unit from being discharged out of the folding type receiving unit upon closing of the disposable folding type sanitary toilet for pets.

7. The disposable folding type sanitary toilet for pets according to claim 6, wherein the filter is formed of a woven or non-woven fabric, a porous fiber, or impregnated material, and the filter is provided at a center of an exterior surface thereof with a spread grip for allowing the filter to be easily pulled out of the entrance and expanded to engage the edges of the entrance and provide a seal.

8. The disposable folding type sanitary toilet for pets according to claim 1, wherein the wall unit is formed in the shape of a polygon when viewed in plan view, and the wall unit further has polygonal protrusions formed between the horizontal folds provided at the exterior thereof.

9. The disposable folding type sanitary toilet for pets according to claim 8, wherein the protrusions are configured such that
a point on a first circumscribed line forming a corresponding one of the horizontal folds when viewed in development view is connected to two points on a first inscribed line adjacent to the first circumscribed line in oblique directions to form a first auxiliary circumscribed line and a first auxiliary inscribed line,
a point on a second circumscribed line located on the same line as the point on the first circumscribed line is connected to the first auxiliary circumscribed line and the first auxiliary inscribed line to form a second auxiliary circumscribed line and a second auxiliary inscribed line, and
the first auxiliary circumscribed line, the second auxiliary circumscribed line, the first auxiliary inscribed line, and the second auxiliary inscribed line are folded to form a protrusion configured in the shape of two triangles connected to each other at one side of each thereof.

10. The disposable folding type sanitary toilet for pets according to claim 9, wherein the first circumscribed line, the first inscribed line, and the second circumscribed line further form a protrusion in a horizontally symmetric manner while the first circumscribed line, the first inscribed line, and the second circumscribed line are spaced apart from the first auxiliary circumscribed line, the second auxiliary circumscribed line, the first auxiliary inscribed line, and the second auxiliary inscribed line by predetermined distances.

11. The disposable folding type sanitary toilet for pets according to claim 9, wherein the wall unit is configured such that
a point on a first circumscribed line forming a corresponding one of the horizontal folds when viewed in development view is connected to a point on a first inscribed line adjacent to the first circumscribed line in an oblique direction to form a third auxiliary circumscribed line, and
a point on a second circumscribed line located on the same line as the point on the first circumscribed line is connected to the first auxiliary circumscribed line to form a fourth auxiliary circumscribed line.

12. The disposable folding type sanitary toilet for pets according to claim 1, wherein
the case unit comprises a fixing frame unit and a cover unit,
the fixing frame unit has a space defined therein for receiving the lower receiving part such that the lower receiving part is fixed in the space of the fixing frame unit, and
the cover unit is connected to one side of the fixing frame unit to protect the folding type receiving unit during shipment and display, seal the folding type receiving unit during disposal, and optionally serve as a mat on which dirt which has attached itself to a pet is deposited after the pet exits the folding type receiving unit during use.

13. The disposable folding type sanitary toilet for pets according to claim 12, wherein the cover unit comprises:
a first side cover connected to one side of the fixing frame unit for covering one side of the folding type receiving unit in a folded state of the folding type receiving unit;
a top cover integrally connected to the first side cover for covering the top of the folding type receiving unit; and
a second side cover integrally connected to the top cover for covering the other side of the folding type receiving unit.

14. The disposable folding type sanitary toilet for pets according to claim 12, wherein
the fixing frame unit is provided at one side thereof with a locking slot, and
the cover unit is provided at one side thereof covering the side of the fixing frame unit at which the locking slot is formed with a locking tab corresponding to the locking slot.

15. The disposable folding type sanitary toilet for pets according to claim 14, wherein the locking tab has one side integrally connected to the cover unit and the other side cut and separated from the cover unit such that the other side of the locking tab may be engaged into the locking slot of the fixing frame unit upon pushing the locking tab into the locking slot.

16. The disposable folding type sanitary toilet for pets according to claim 12, further comprising:
a handle provided on the exterior of the case unit at one side thereof; and
an adhesive member or a fastening member provided on the exterior of the cover unit at one side thereof for maintaining and holding the case unit containing the folding type receiving unit in a folded state.

17. The disposable folding type sanitary toilet for pets according to claim 1, wherein the lower receiving part has a predetermined height sufficient to receive pet litter.

18. The disposable folding type sanitary toilet for pets according to claim 1, wherein the wall unit and the lower receiving part are made of a waterproof material or are coated internally with a nonabsorbent waterproof material.

\* \* \* \* \*